(12) United States Patent
Liu et al.

(10) Patent No.: US 12,192,655 B2
(45) Date of Patent: *Jan. 7, 2025

(54) TIME DELAY INTEGRATION SENSOR HANDLING DEFECT PIXELS

(71) Applicants: PIXART IMAGING INC., Hsin-Chu County (TW); TAIWAN SPACE AGENCY, Hsin-Chu (TW)

(72) Inventors: Ren-Chieh Liu, Hsin-Chu County (TW); Chao-Chi Lee, Hsin-Chu County (TW); Yi-Yuan Chen, Hsin-Chu County (TW); En-Feng Hsu, Hsin-Chu County (TW)

(73) Assignees: PIXART IMAGING INC., Hsin-Chu County (TW); TAIWAN SPACE AGENCY, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,265

(22) Filed: Nov. 7, 2023

(65) Prior Publication Data

US 2024/0073563 A1 Feb. 29, 2024

Related U.S. Application Data

(63) Continuation of application No. 17/849,711, filed on Jun. 27, 2022, now Pat. No. 11,849,236.

(30) Foreign Application Priority Data

Oct. 15, 2021 (TW) .................................. 110138441

(51) Int. Cl.
*H04N 25/768* (2023.01)
*H04N 25/531* (2023.01)
*H04N 25/75* (2023.01)

(52) U.S. Cl.
CPC ......... *H04N 25/768* (2023.01); *H04N 25/531* (2023.01); *H04N 25/75* (2023.01)

(58) Field of Classification Search
CPC .... H04N 25/768; H04N 25/531; H04N 25/75; H04N 25/683
See application file for complete search history.

(56) References Cited

U.S. PATENT DOCUMENTS 8,982,262 B2 * 3/2015 Bugnet ................ H04N 25/768
257/292
9,148,601 B2 9/2015 Fox
(Continued)

FOREIGN PATENT DOCUMENTS

CN 104363391 A 2/2015
JP 3379652 B2 * 2/2003 ............. H04N 5/335
(Continued)

*Primary Examiner* — Nhan T Tran
(74) *Attorney, Agent, or Firm* — HAUPTMAN HAM, LLP

(57) ABSTRACT

The present disclosure provides a time delay integration (TDI) sensor using a rolling shutter. The TDI sensor includes multiple pixel columns. Each pixel column includes multiple pixels arranged in an along-track direction, wherein two adjacent pixels or two adjacent pixel groups in every pixel column have a separation space therebetween. The separation space is equal to a pixel height multiplied by a time ratio of a line time difference of the rolling shutter and a frame period, or equal to a summation of at least one pixel height and a multiplication of the pixel height by the time ratio of the line time difference and the frame period. The TDI sensor further records defect pixels of a pixel array such that in integrating pixel data to integrators, the pixel data associated with the defect pixels is not integrated into corresponding integrators.

16 Claims, 11 Drawing Sheets

(56) References Cited

U.S. PATENT DOCUMENTS

| | | | |
|---|---|---|---|
| 11,849,236 B2 * | 12/2023 | Liu | ...................... H04N 25/531 |
| 2014/0085518 A1 * | 3/2014 | Fox | ...................... H04N 25/768 |
| | | | 348/E5.091 |

FOREIGN PATENT DOCUMENTS

| | | | | |
|---|---|---|---|---|
| JP | 3824344 B2 * | 9/2006 | ............ | H04N 5/335 |
| TW | 201130303 A | 9/2011 | | |
| TW | 201939939 A | 10/2019 | | |

* cited by examiner

TIME DELAY INTEGRATION SENSOR HANDLING DEFECT PIXELS

CROSS REFERENCE TO RELATED APPLICATION

This application is a continuation application of U.S. patent application Ser. No. 17/849,711 filed on Jun. 27, 2022, which claims the priority benefit of Taiwan Patent Application Serial Number 110138441, filed on Oct. 15, 2021, and the full disclosures of which are incorporated herein by reference.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a time delay integration (TDI) sensor and, more particularly, to a TDI CMOS image sensor recorded with defect pixels such that pixel data associated with the defect pixels are ignored in integrating pixel data.

2. Description of the Related Art

The time delay integration (TDI) sensor uses an area array image sensor to capture images from an imaging platform that is moving relative to the imaged object or scene at a constant speed. The TDI sensor is conceptually considered as the stack of linear arrays, wherein each linear array moves across a same point of the scene at a time period that the image sensor moves a distance of one pixel.

Conventionally, the charge-coupled device (CCD) technology has been used for TDI applications because CCDs intrinsically operate by shifting charge from pixel to pixel across the image sensor to allow charges between pixels to integrate when the image sensor moves across a same point of the imaged scene. However, CCD technology is relatively expensive to fabricate and CCD imaging devices consume relatively high power.

Although using a CMOS circuit can achieve lower power, higher degree of integration and higher speed, the existing designs suffer from higher noises. Although a 4-transistor (4T) structure can be used to minimize noises, the 4T pixels are clocked using a rolling shutter technique. Using the rolling shutter clocking can cause artifacts in the captured image since not all pixels are integrated over the same time period.

Therefore, U.S. Pat. No. 9,148,601 provides a CMOS image sensor for TDI imaging. Please refer to FIG. 1, the CMOS image sensor includes multiple pixel columns 112, and each pixel column is arranged to be parallel to an along-track direction $D_{a\_t}$. For compensating the integration interval of the rolling shutter of the CMOS image sensor, a physical offset 150 is further arranged between two adjacent pixels of each pixel column 112, wherein if the pixel column 112 has N rows, each physical offset 150 is equal to a pixel height divided by N.

However, when the pixel columns 112 have defect pixels, errors can occur in integrating pixel data.

Accordingly, the present disclosure further provides a TDI CMOS image sensor capable of repairing pixel data of defect pixels.

SUMMARY

The present disclosure provides a TDI CMOS image sensor with a separation space determined according to a pixel height, a line time difference of a rolling shutter and a frame period.

The present disclosure further provides a TDI CMOS image sensor having reserved pixels such that when any of normal pixels has defect, pixel data of the reserved pixels is used to replace pixel data of the normal pixels.

The present disclosure further provides a TDI CMOS image sensor that directly ignores pixel data of defect pixels in an integrating stage.

The present disclosure further provides a TDI CMOS image sensor that directly repairs pixel data of defect pixels in a post-processing stage.

To achieve the above objective, the present disclosure provides a TDI image sensor that captures an image frame using a rolling shutter and moves with respect to a scene in an along-track direction. The image sensor includes a pixel array and multiple integrators. The pixel array has multiple pixel columns, each of the pixel columns includes multiple pixels arranged in the along-track direction, and two adjacent pixels of each of the pixel columns have a separation space therebetween, wherein the multiple pixels of each of the pixel columns include multiple normal pixels and at least one reserved pixel, and the separation space comprises a multiplication of a pixel height in the along-track direction by a time ratio of a line time difference of the rolling shutter and a frame period of capturing the image frame. The multiple integrators are respectively coupled to the multiple pixel columns, and each of the multiple integrators is configured to integrate pixel data of the multiple normal pixels at a corresponding pixel column. When the multiple normal pixels have a defect pixel, the integrator corresponding to a pixel column of the defect pixel integrates pixel data of the reserved pixel to replace pixel data of the defect pixel.

In addition, the present disclosure further provides a TDI image sensor that captures an image frame using a rolling shutter and moves with respect to a scene in an along-track direction. The image sensor includes a pixel array and multiple integrators. The pixel array has multiple pixel columns, each of the pixel columns includes multiple pixels arranged in the along-track direction, and two adjacent pixels of each of the pixel columns have a separation space therebetween, wherein the separation space comprises a multiplication of a pixel height in the along-track direction by a time ratio of a line time difference of the rolling shutter and a frame period of capturing the image frame. The multiple integrators are respectively coupled to the multiple pixel columns, and each of the multiple integrators is configured to integrate pixel data of the multiple pixels at a corresponding pixel column. When the multiple pixels have a defect pixel, the integrator corresponding to a pixel column of the defect pixel does not integrate pixel data of the defect pixel.

The present disclosure further provides a TDI image sensor that captures an image frame using a rolling shutter and moves with respect to a scene in an along-track direction. The image sensor includes a pixel array and multiple integrators. The pixel array has multiple pixel columns, each of the pixel columns includes multiple pixels arranged in the along-track direction, and two adjacent pixels of each of the pixel columns have a separation space therebetween, wherein the separation space comprises a multiplication of a pixel height in the along-track direction by a time ratio of a line time difference of the rolling shutter and a frame period of capturing the image frame. The multiple integrators are respectively coupled to the multiple pixel columns, and each of the multiple integrators is configured to integrate pixel data of the multiple pixels at a corresponding pixel column. When the multiple pixels have a defect pixel, a first integration number of pixel data of a first integrator corresponding to a first pixel column at which the defect pixel is located is smaller than a second integration number of pixel data of a second integrator corresponding to a second pixel column at which the defect pixel is not located.

In the present disclosure, the separation space is not directly related to a size of the pixel array (i.e. a number of pixels), and the separation space can be determined as long as a frame period and a line time difference are determined.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The CMOS image sensor of the present disclosure compensates a line time difference in time delay integration (TDI) imaging using a rolling shutter by arranging a separation space between pixels in an along-track direction. Accordingly, pixel data corresponding to the same position of an imaged scene is integrated in successive image frames so as to increase the signal-to-noise ratio (SNR), wherein a number of integration is related to a size of pixel array.

The concept of TDI imaging is known to the art, and the present disclosure is to eliminate the imaging distortion generated in a TDI CMOS image sensor using rolling shutter technique.

Figure 2:
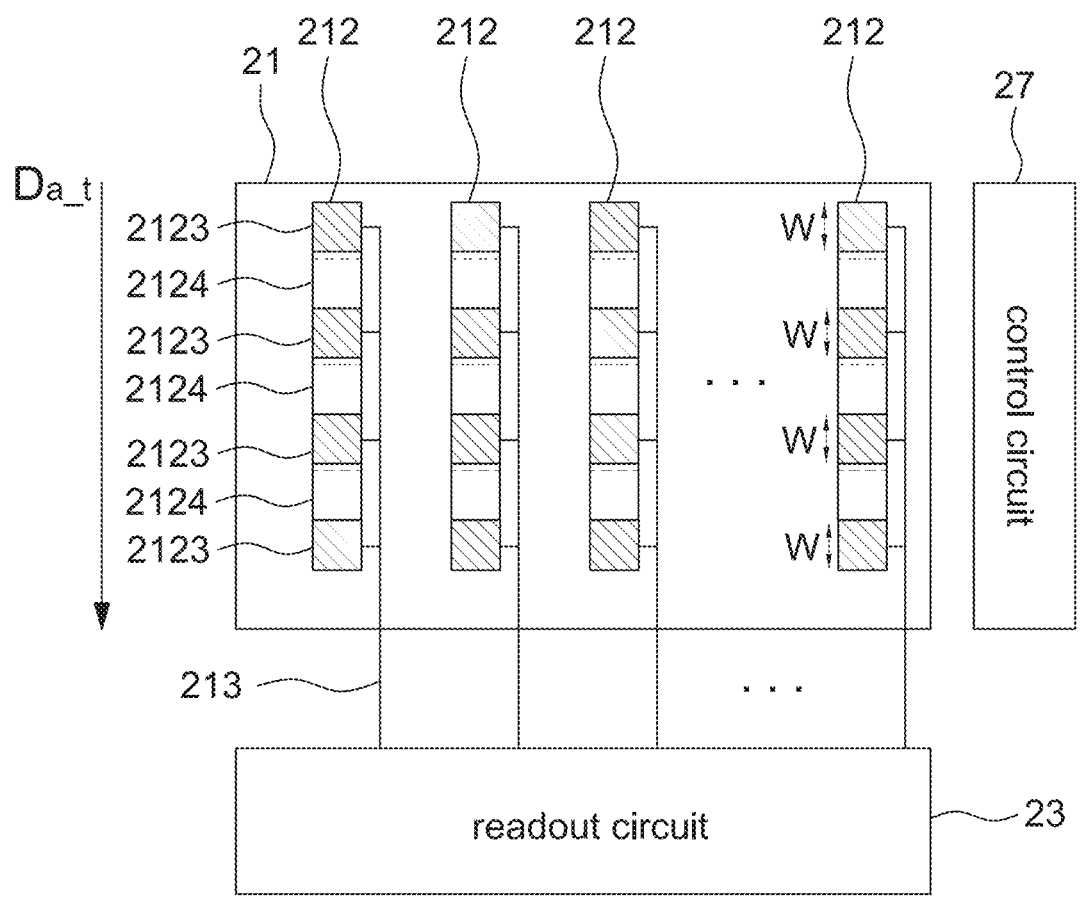
FIG. 2 is a schematic diagram of a TDI CMOS image sensor according to a first embodiment of the present disclosure.

Please refer to FIG. 2, it is a schematic diagram of a TDI CMOS image sensor 200 according to a first embodiment of the present disclosure. The TDI CMOS image sensor 200 captures image frames using a rolling shutter, and moves toward an along-track direction $D_{a\_t}$ with respect to a scene, wherein the scene is determined according to an application of the TDI CMOS image sensor 200. For example, when the TDI CMOS image sensor 200 is applied to a scanner, the scene is a scanned document; whereas, when the TDI CMOS image sensor 200 is applied to a satellite or aircraft, the scene is a ground surface.

The operation of the rolling shutter is known to the art, and thus details thereof are not described herein.

The TDI CMOS image sensor 200 includes a pixel array 21. The pixel array 21 includes multiple pixel columns 212. Each of the pixel columns 212 includes multiple pixels 2123 (e.g., shown as regions filled with slant lines herein) arranged in the along-track direction $D_{a\_t}$ (e.g., shown as a longitudinal direction of the pixel array 21). Two adjacent pixels of each pixel column 212 have a separation space 2124 (e.g., shown as blank regions herein) therebetween.

Figure 3:
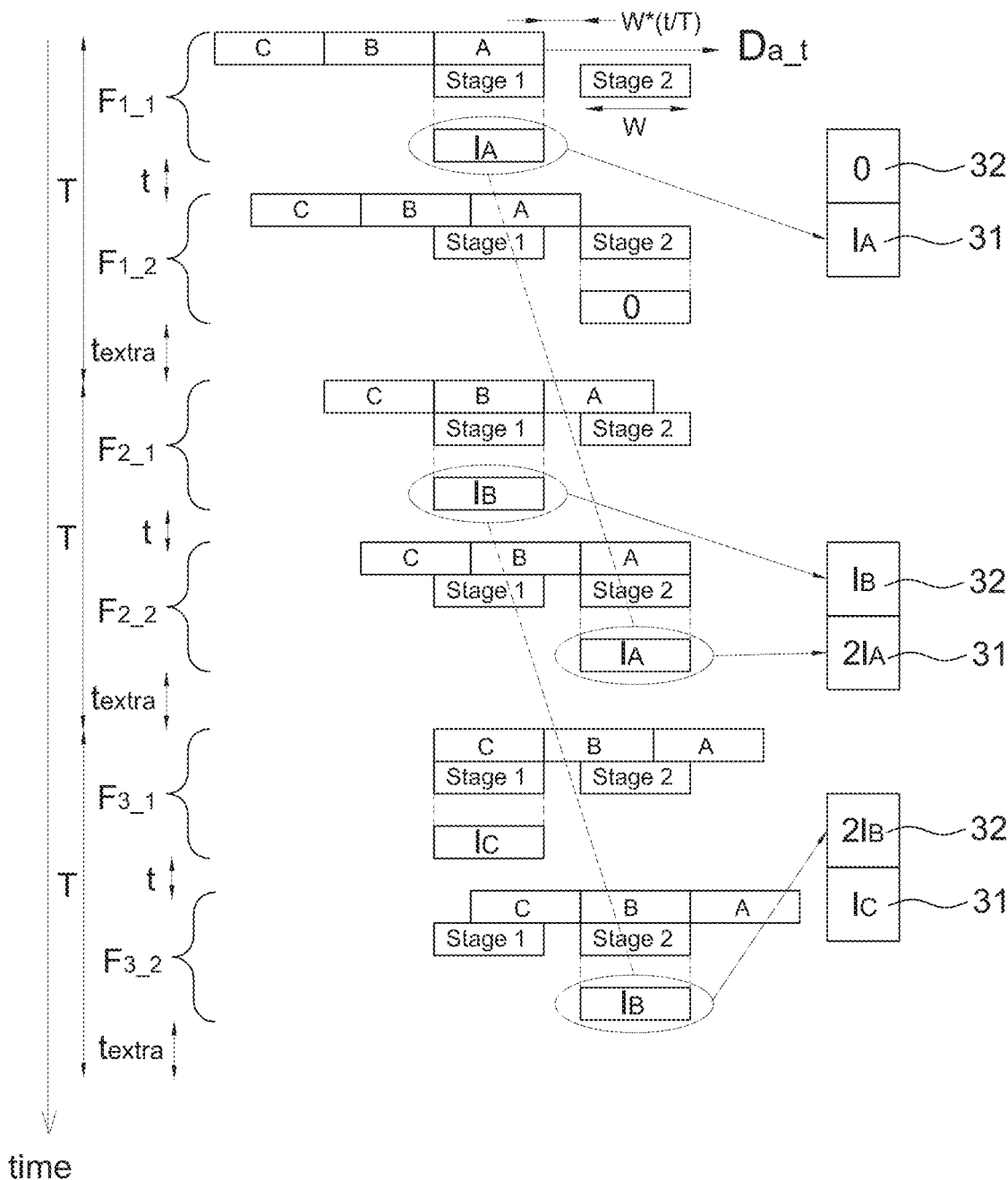
FIG. 3 is an operational schematic diagram of the TDI CMOS image sensor of FIG. 2.

Please refer to FIG. 3, it is an operational schematic diagram of the TDI CMOS image sensor 200 of FIG. 2. In one aspect, the separation space 2124 is equal to a multiplication of a pixel height W of one pixel 2123 in the along-track direction $D_{a\_t}$ by a time ratio of a line time difference t of the rolling shutter and a frame period T of capturing the image frame (e.g., FIG. 3 showing three image frames), i.e. separation space=W×t/T.

In the present disclosure, the line time difference t is a time interval between a time of starting or ending exposure of two adjacent pixel rows.

In FIG. 3, it is assumed that the scene includes 3 positions or objects A, B and C moving rightward (i.e. along-track direction $D_{a\_t}$). Stage1 and Stage2 indicate two pixel rows of each pixel column 212, wherein the separation space W×t/T is arranged between Stage1 and Stage2. In the present disclosure, the frame period T is determined according to brightness of the scene and a sensitivity of the pixel array 21. A moving speed of the TDI CMOS image sensor 200 is set as the pixel height W divided by the frame period T.

Because FIG. 3 assumes that the pixel column 212 of the pixel array 21 has two pixel rows, the frame period T, in which the TDI CMOS image sensor 200 captures one image frame, includes two line times, which have a line time difference t. Herein, a line time is referred to a processing time interval for accomplishing the exposing and reading of one pixel row. For example, FIG. 3 shows that a first image frame includes two pixel rows $F_{1\_1}$ and $F_{1\_2}$; a second image frame includes two pixel rows $F_{2\_1}$ and $F_{2\_2}$; and a third image frame includes two pixel rows $F_{3\_1}$ and $F_{3\_2}$.

In this embodiment, the TDI CMOS image sensor 200 further includes multiple integrators, e.g., FIG. 3 showing two integrators 31 and 32, wherein the integrators are, for example, a buffer (i.e. digital integrator) or a capacitor (i.e. analog integrator), and a number of the integrators are preferably corresponding to a number of pixel columns 212 so as to determine a width of the imaged scene. The integrators 31 and 32 are respectively used to integrate pixel data in adjacent image frames corresponding to a same position or object of the scene.

For example, in the first image frame (e.g., including $F_{1\_1}$ and $F_{1\_2}$), Stage1 senses pixel data of the position or object A of the scene, and integrates (or adds) to the integrator 31, e.g., shown as $I_A$; now, the integrator 32 does not yet integrate (or store) any pixel data, e.g., shown as 0.

As the scene moves in the along-track direction $D_{a\_t}$ at a speed W/T, in the second image frame (e.g., including $F_{2\_1}$ and $F_{2\_2}$), Stage1 senses pixel data of the position or object B of the scene, and integrates (or adds) to the integrator 32, e.g., shown as $I_B$; and Stage2 senses pixel data of the position or object A of the scene, and integrates (or adds) to the integrator 31, e.g., shown as $2I_A$ (indicating integrated by two times).

As the scene continuously moves in the along-track direction $D_{a\_t}$ at the speed W/T, in the third image frame (e.g., including $F_{3\_1}$ and $F_{3\_2}$), the pixel data $2I_A$ associated with the object A already integrated in the integrator 31 is read out at first. Next, Stage1 senses pixel data of the position or object C of the scene, and integrates (or adds) to the integrator 31, e.g., shown as $I_C$; and Stage2 senses pixel data of the position or object B of the scene, and integrates (or adds) to the integrator 32, e.g., shown as $2I_B$ (indicating integrated by two times). When the scene is continuously imaged, the TDI CMOS image sensor 200 continuously integrates and reads pixel data using the process as shown in FIG. 3 to improve the SNR of the captured image frame.

In one aspect, the frame period T (or called exposure interval of one image frame) is larger than a summation of row exposure times for capturing all pixel rows of the pixel array 21 using the rolling shutter, e.g., FIG. 3 showing that an extra time $t_{extra}$ is left after a second pixel row of every image frame is exposed and read.

In one non-liming aspect, within a time difference (i.e. $t_{extra}$) between the frame period T and the summation of row exposure times, the image sensor 200 enters a sleep mode to save power.

In one non-liming aspect, a column analog-to-digital converter (ADC) (e.g., included in the readout circuit 23) of the TDI CMOS image sensor 200 performs, within the time difference $t_{extra}$, the analog-digital (AD) conversion on pixel signals of auxiliary pixels (e.g., dark pixels), external voltages or temperatures of an external temperature sensor of the pixel array 21. More specifically, within the time difference $t_{extra}$, the column ADC is used to perform the AD conversion on sensing signals outside the pixel columns 212 so as to broaden applications of the TDI CMOS image sensor 200. In this aspect, a line time is preferably set as the minimum time required for processing one row of pixel data.

In this embodiment, the readout circuit 23 samples every pixel using, e.g., correlation double sampling (CDS).

Please refer to FIG. 2 again, in another aspect, the separation space 2124 is equal to a summation of a pixel height W in the along-track direction $D_{a\_t}$ and a multiplication of the pixel height W by a time ratio of a line time difference t of the rolling shutter and a frame period T of capturing the image frame, i.e. separation space=W×(y+t/T).

Figure 4A:
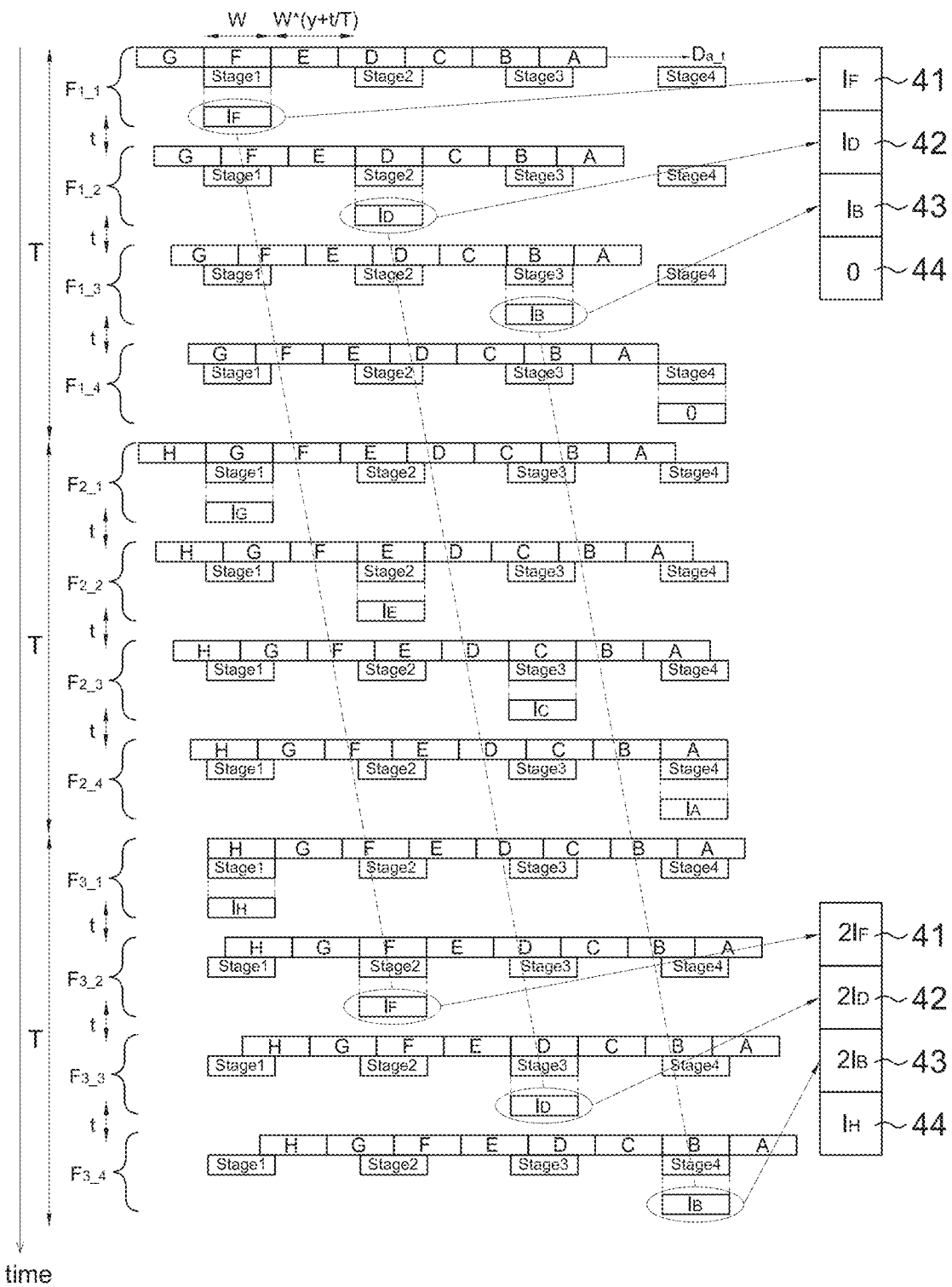
FIG. 4A is another operational schematic diagram of the TDI CMOS image sensor of FIG. 2.

Please refer to FIG. 4A together, it is another operational schematic diagram of the TDI CMOS image sensor 200 of FIG. 2. In FIG. 4A, it is assumed that one scene includes eight positions or objects A to H, and moves rightward (i.e. along-track direction $D_{a\_t}$). Stage 1 to Stage 4 indicate four pixel rows of one pixel column 212, wherein the separation space W×(y+t/T) is arranged between two adjacent pixels, wherein y=0 or a positive integer. FIG. 4A shows an aspect that y=1; and an aspect of y=0 is shown in FIG. 3.

Because FIG. 4A assumes that the pixel array 21 includes four pixel rows, thus the frame period T of the TDI CMOS image sensor 200 for capturing one image frame includes four line times, which have a line time difference t from each other. For example, FIG. 4A shows that one image frame includes four pixel rows $F_{1\_1}$ to $F_{1\_4}$; a next image frame includes four pixel rows $F_{2\_1}$ to $F_{2\_4}$; and a further next image frame includes four pixel rows $F_{3\_1}$ to $F_{3\_4}$; and so on.

Similarly, the TDI CMOS image sensor 200 further includes multiple integrators, e.g., FIG. 4A showing four integrators 41 to 44. The integrator 41 is used to integrate pixel data in a first image frame (e.g., frame including $F_{1\_1}$ to $F_{1\_4}$) and a second image frame (e.g., frame including $F_{3\_1}$ to $F_{3\_4}$) corresponding to the same position (e.g., position or object F) of the scene, wherein the first image frame and the second image frame is separated by one image frame (e.g., frame including $F_{2\_1}$ to $F_{2\_4}$). The operations of other integrators 42 to 44 are identical to that of the integrator 41, and the difference is in integrating the pixel data at different positions or objects.

It is seen from FIG. 4A that a first pixel (e.g., Stage1) in the first image frame for sensing pixel data (e.g., $I_F$) of the same position (e.g., F) and a second pixel (e.g., Stage2) in the second image frame for sensing pixel data (e.g., $I_F$) of the same position (e.g., F) are two adjacent pixels of the same pixel column 212 in the pixel array 21. Therefore, the integrators (e.g., 41 to 44) do not integrate the pixel data $I_F$ in the first pixel and the second pixel corresponding to the same position within a frame period of the one image frame between the first image frame and the second image frame. The sensing and integration of positions or objects D and B are shown by dashed lines and arrows in FIG. 4A.

In the aspect of FIG. 4A, because the integrators 41 to 44 integrate pixel data in the image frames separated by one image frame (e.g., frame including $F_{2\_1}$ to $F_{2\_4}$) corresponding to the same position or the same object of a scene, if it is assumed that the pixel columns 212 have N pixels, the integrators 41 to 44 integrate N/2 times of pixel data corresponding to the same position or the same object of the scene.

The pixel data of the image frame $F_{2\_1}$ to $F_{2\_4}$ is integrated in another group of integrators, wherein the pixel data of the same position or the same object of the scene is also integrated by skipping one image frame (e.g., frame including $F_{3\_1}$ to $F_{3\_4}$).

When y=n, a same position of the scene is sensed by a next adjacent pixel of the same pixel column 212 after n image frames. As long as the control signal outputted by the control circuit 27 is properly arranged, the pixel data of the same position or object of the scene is accurately integrated in the same integrator.

Figure 4B:
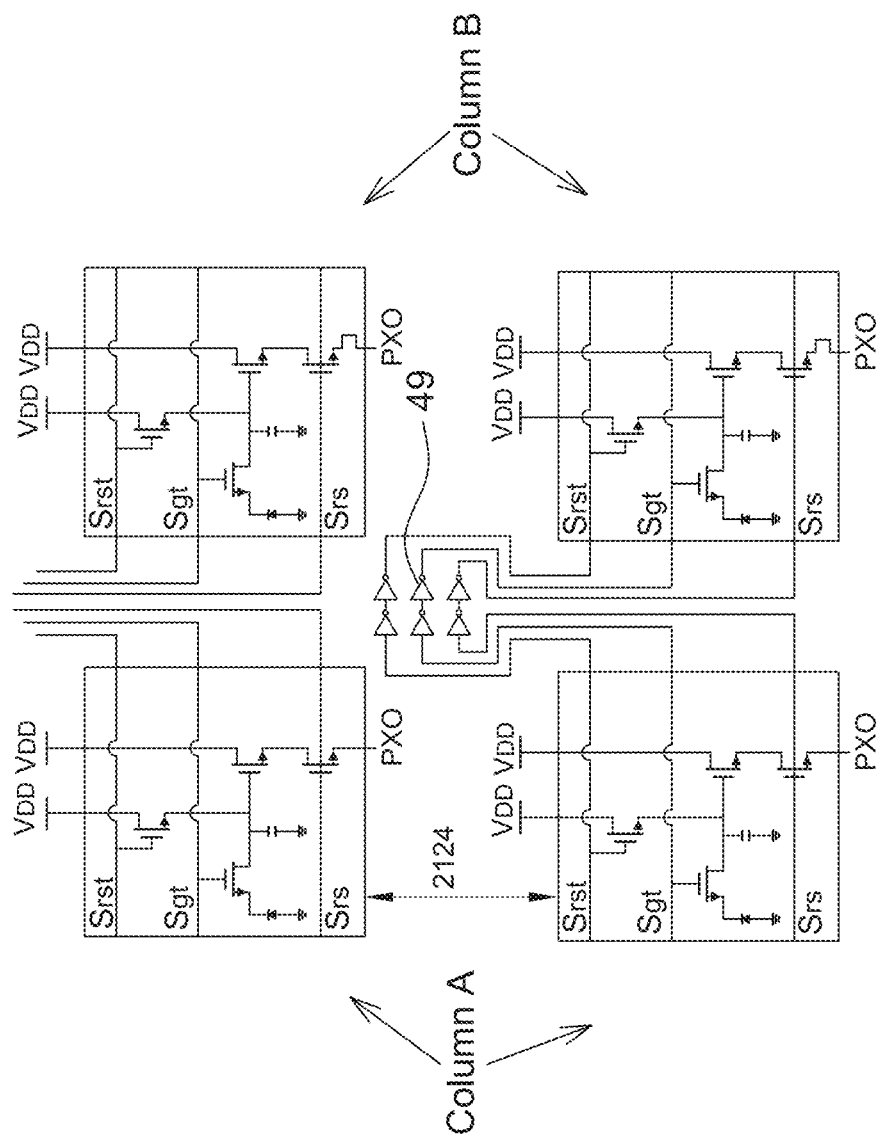
FIG. 4B is a schematic diagram of arranging buffers within the separation space of the TDI CMOS image sensor of FIG. 2.

In addition, in the aspect of FIG. 4A, because adjacent pixels of the pixel columns 212 have a larger separation space 2124, in the case that a wider scene image is required, it is possible to arrange buffers in the separation space 2124 every predetermined number of pixel columns to buffer or amplify control signals of the pixel row. For example as shown in FIG. 4B, in the separation space 2124, the buffers 49 are arranged to buffer or amplify pixel control signals, e.g., including the reset signal Srst, signal transfer signal Sgt and row selection signal Srs, but not limited to. In this way, even a pixel array having a large number of pixel columns can still operate accurately.

Figure 5:
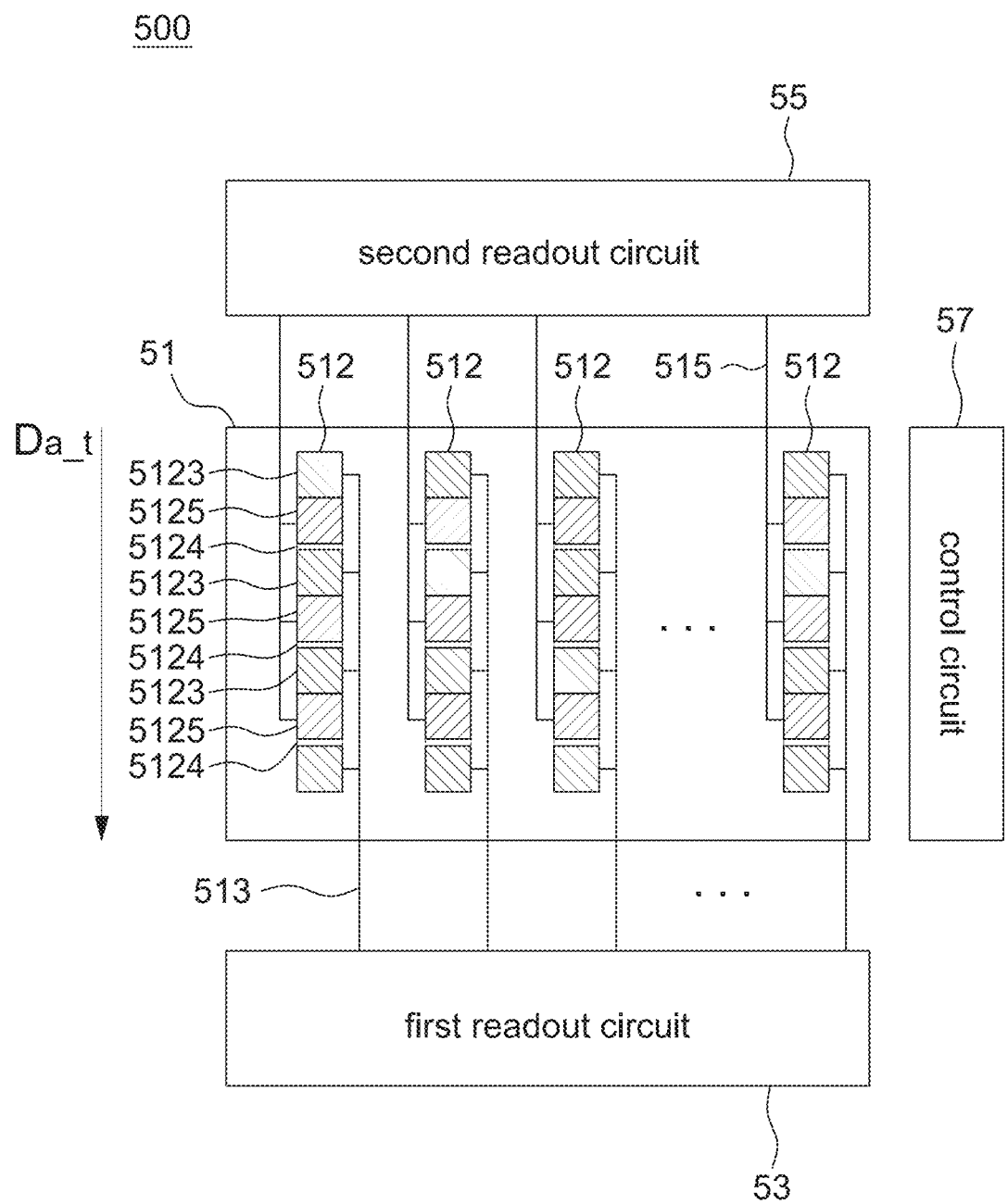
FIG. 5 is a schematic diagram of a TDI CMOS image sensor according to a second embodiment of the present disclosure.

Please refer to FIG. 5, it is a schematic diagram of a TDI CMOS image sensor 500 according to a second embodiment of the present disclosure. The TDI CMOS image sensor 500 also captures an image frame using a rolling shutter, and moves toward an along-track direction $D_{a\_t}$ with respect to a scene.

The TDI CMOS image sensor 500 includes a pixel array 51. The pixel array 51 includes multiple pixel columns 512 each including multiple pixels arranged in the along-track direction $D_{a\_t}$. A separation space 5124 is arranged between two adjacent pixel groups to compensate a line time difference in using the rolling shutter, wherein each pixel group includes a first pixel 5123 and a second pixel 5215 directly connected to each other, i.e. no separation space 5124 therebetween.

The TDI CMOS image sensor 500 further includes a first readout circuit 53 and a second readout circuit 55. As shown in FIG. 5, the first readout circuit 53 is coupled to multiple first pixels 5123 in the pixel columns 512 via a readout line 513 so as to read pixel data of the first pixels 5123, and the second readout circuit 55 is coupled to multiple second pixels 5125 in the pixel columns 512 via a readout line 515 so as to read pixel data of the second pixels 5125.

Figure 6:
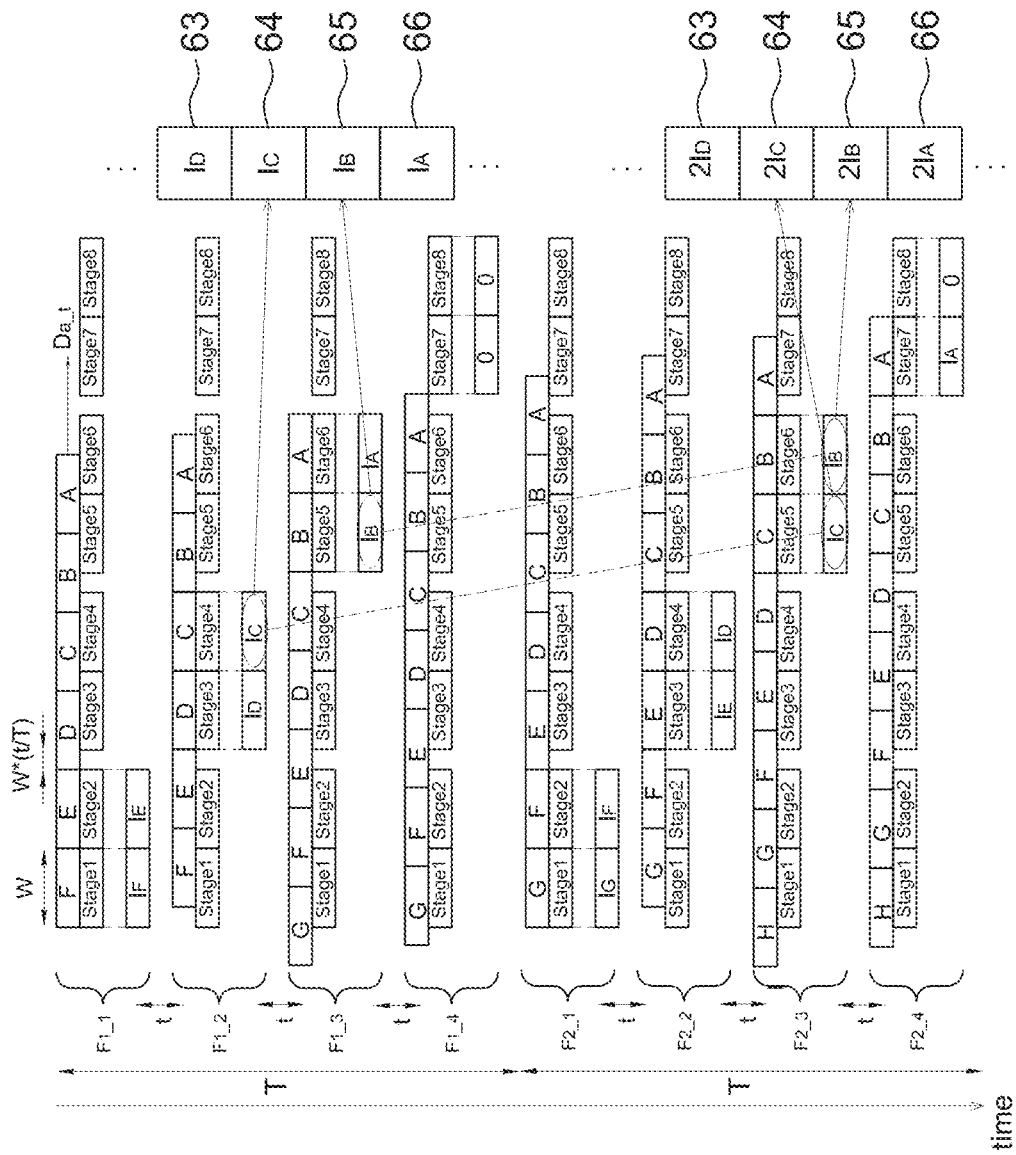
FIG. 6 is an operational schematic diagram of the TDI CMOS image sensor of FIG. 5.

Please refer to FIG. 6, it shows an operational schematic diagram of the TDI CMOS image sensor 500 in FIG. 5. In one aspect, the separation space 5124 is a multiplication of a pixel height W in the along-track direction $D_{a\_t}$ by a time ratio of a line time difference t of the rolling shutter and a frame period T of capturing the image frame (e.g., FIG. 6 showing two image frames), i.e. separation space=W×t/T.

In FIG. 6, it is assumed that a scene includes eight positions or objects A to H, and moves rightward (i.e. along-track direction $D_{a\_t}$).

In this embodiment, the readout circuits 53 and 55 uses, e.g., CDS to sample every pixel. In FIG. 6, Stage1 and Stage2, Stage3 and Stage4, Stage5 and Stage 6, Stage1 and Stage8 respectively indicate one pixel group of one pixel column 512, wherein Stage1, Stage3, Stage5 and Stage1 are first pixels 5123, and Stage2, Stage4, Stage6 and Stage8 are second pixels 5125. The separation space W×t/T is arranged between two adjacent pixel groups.

Because it is assumed that the pixel array 51 in FIG. 6 has four pixel groups in the along-track direction $D_{a\_t}$, a frame period T that the TDI CMOS image sensor 500 captures one image frame includes 4 line times, which have a line time difference t between each other. For example, FIG. 6 shows that a first image frame includes four rows of pixel groups $F_{1\_1}$ to $F_{1\_4}$; and a second image frame includes four rows of pixel groups $F_{2\_1}$ to $F_{2\_4}$.

In this embodiment, the first pixel 5123 and the second pixel 5125 of each pixel group are exposed simultaneously, and the pixel data thereof is respectively integrated by the first readout circuit 53 and the second readout circuit 55 simultaneously.

For example, in the line time of $F_{1\_2}$ of a first image frame (e.g., frame including $F_{1\_1}$ to $F_{1\_4}$), Stage3 and Stage4 are exposed at the same time, and pixel data of Stage3 (e.g., ID) is integrated by the first readout circuit 53 to the integrator 63, and pixel data of Stage4 (e.g., $I_C$) is integrated by the second readout circuit 55 to the integrator 64. In the line time of $F_{1\_3}$ of the first image frame, Stage5 and Stage6 are exposed at the same time, and pixel data of Stage5 (e.g., $I_B$) is integrated by the first readout circuit 53 to the integrator 65, and pixel data of Stage6 (e.g., $I_A$) is integrated by the second readout circuit 55 to the integrator 66. The exposure and integration of other line times in a frame period T of the first image frame are similar to the line times $F_{1\_2}$ and $F_{1\_3}$.

For example, in the line time of $F_{2\_3}$ of a second image frame (e.g., frame including $F_{2\_1}$ to $F_{2\_4}$), Stage5 and Stage6 are exposed at the same time, and pixel data of Stage5 (e.g., $I_C$) is integrated by the first readout circuit 53 to the integrator 64, shown as $2I_C$ indicating integrated by two times; and pixel data of Stage6 (e.g., $I_B$) is integrated by the second readout circuit 55 to the integrator 65, shown as $2I_B$ indicating integrated by two times. The exposure and integration of other line times in a frame period T of the second image frame are similar to the line times $F_{2\_3}$.

For example, the first readout circuit 53 and the second readout circuit 55 are respectively coupled to each integrator via a switching device (e.g., a multiplexer, but not limited thereto). The switching device is controlled by a control signal (e.g., generated by the control circuit 57) to integrate pixel data read by the first readout circuit 53 or the second readout circuit 55 to the same integrator. It is appreciated that FIG. 6 shows only a part of integrators for describing the present disclosure.

More specifically, multiple integrators of the TDI CMOS image sensor 500 respectively store pixel data in the first image frame (e.g., frame including $F_{1\_1}$ to $F_{1\_4}$) and the second image frame (e.g., frame including $F_{2\_1}$ to $F_{2\_4}$), adjacent to each other, corresponding to the same position (e.g., B) of a scene, wherein in the first image frame, pixel data (e.g. $I_B$) corresponding to a same position (e.g., B) of the scene is read by the first readout circuit 53 and integrated to an integrator 65; and in the second image frame, the pixel data (e.g. $I_B$) corresponding to the same position (e.g., B) of the scene is read by the second readout circuit 55 and integrated to the integrator 65. As long as the output signal of the control circuit 57 is corresponding arranged, the pixel data read from different readout circuits is correctly integrated in the same integrator. The method of integrating pixel data of associated pixels by other integrators is similar to the descriptions in this paragraph, and thus is not repeated herein.

In other aspects, the above embodiments of FIG. 2 and FIG. 5 are combinable. For example, a separation space between two adjacent pixel groups is a summation of a pixel height W and a multiplication of the pixel height W by a time ratio of a line time difference t of the rolling shutter and a frame period T of capturing the image frame, i.e. separation space=W×(y+t/T).

As mentioned above, the TDI CMOS image sensor integrates pixel data for multiple times using integrators to increase the SNR. However, when the pixel array contains defect pixel(s), errors can occur in integrating pixel data of corresponding pixel columns by integrators. Accordingly, the present disclosure further provides a TDI CMOS image sensor capable of repairing or ignoring pixel data of the defect pixel(s).

Figure 7:
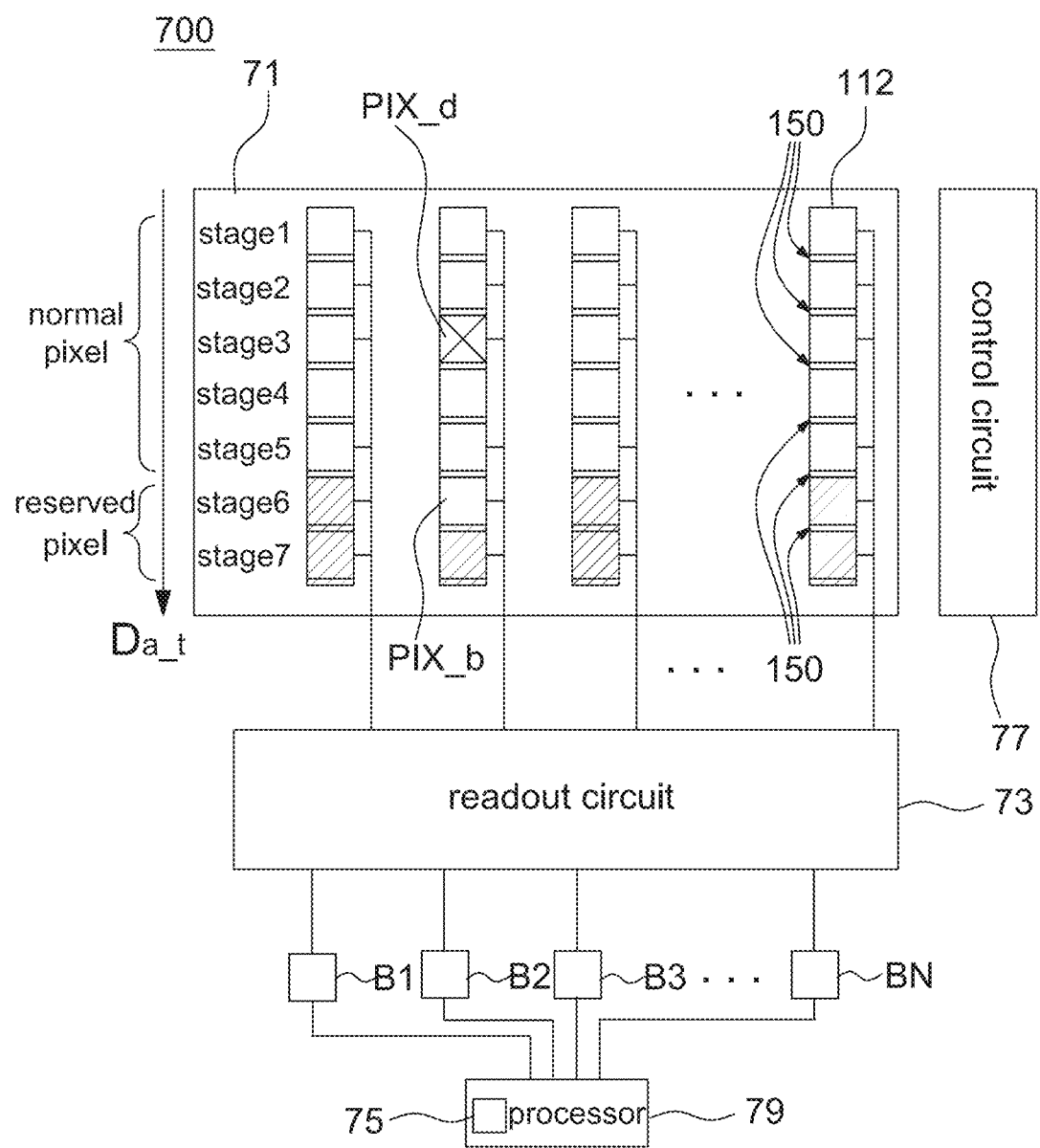
FIGS. 7 to 9 are schematic diagrams of a TDI CMOS image sensor according to a third embodiment of the present disclosure.

Please refer to FIG. 7, it is a schematic diagram of a TDI CMOS image sensor 700 according to a third embodiment of the present disclosure. The TDI CMOS image sensor 700 also captures an image frame using a rolling shutter and moves with respect to a scene in an along-track direction $D_{a\_t}$.

The TDI CMOS image sensor 700 includes a pixel array 71, a readout circuit 73, a control circuit 77, multiple integrators B1-BN and a processor 79.

The pixel array 71 also includes multiple pixel columns 112. Each of the pixel columns 112 includes multiple pixels (e.g., stage1 to stage7) arranged in the along-track direction $D_{a\_t}$, and two adjacent pixels of each of the pixel columns 112 have a separation space 150 therebetween.

The control circuit 77 outputs control signals, e.g., including the row selection signal, reset signal and charge transfer signal, to cause the pixel array 71 to operate in rolling shutter, which is known to the art and thus details thereof are not described herein.

The readout circuit 73 reads data of each pixel that is then integrated in the corresponding integrators B1 to BN, e.g., the multiple integrators B1 to BN respectively integrating pixel data of a same position of a scene in adjacent image frames, which has been illustrated above and thus is not repeated herein.

The difference between the embodiment in FIG. 7 and the above embodiments is that the multiple pixels of each of the pixel columns 112 of the pixel array 71 includes multiple normal pixels (e.g., stage1 to stage5) and at least one reserved pixel (e.g., shown as two reserved pixel rows stage6 and stage7, but the number is not limited to two).

In this embodiment, pixel data of the reserved pixels are not integrated or used while all normal pixels operate normally.

In this embodiment, the multiple integrators B1 to BN are respectively coupled to the multiple pixel columns 112, and each of the multiple integrators B1 to BN integrate pixel data of the multiple normal pixels of a corresponding pixel column 112.

In one aspect, when the multiple normal pixels do not have any defect pixel, the readout circuit 73 does not read pixel data of a reserved pixel row; and only when the multiple normal pixels have a defect pixel PIX_d, the readout circuit 73 reads pixel data of the reserved pixel row.

As shown in FIG. 7, when the multiple normal pixels have a defect pixel PIX_d, an integrator (e.g., B2 herein) corresponding to a pixel column that the defect pixel PIX_d is located integrates pixel data of the reserved pixel PIX_b of the pixel column to replace pixel data of the defect pixel PIX_d. That is, the integrator B2 integrates pixel data of pixels stage1, stage2, stage4, stage5 and stage6.

In another aspect, when the multiple normal pixels do not have any defect pixel, the readout circuit 73 reads pixel data of a reserved pixel row, but the pixel data of the reserved pixel row read by the readout circuit 73 is not integrated into the multiple integrators B1 to BN. That is, when there is not defect pixel, the integrator B2 integrates pixel data of pixels stage1, stage2, stage3, stage4 and stage5.

Figure 8:
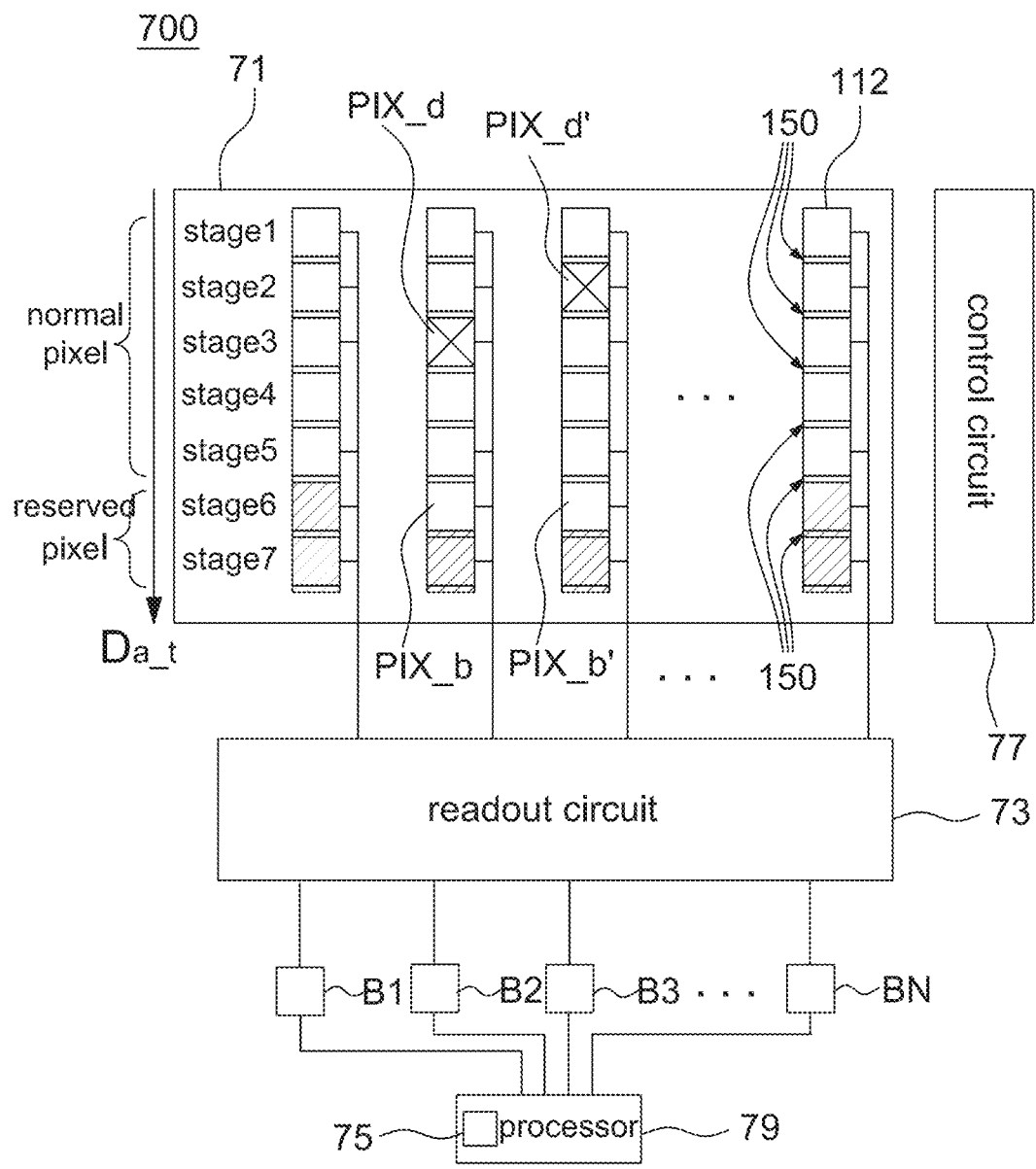
Figure 9:
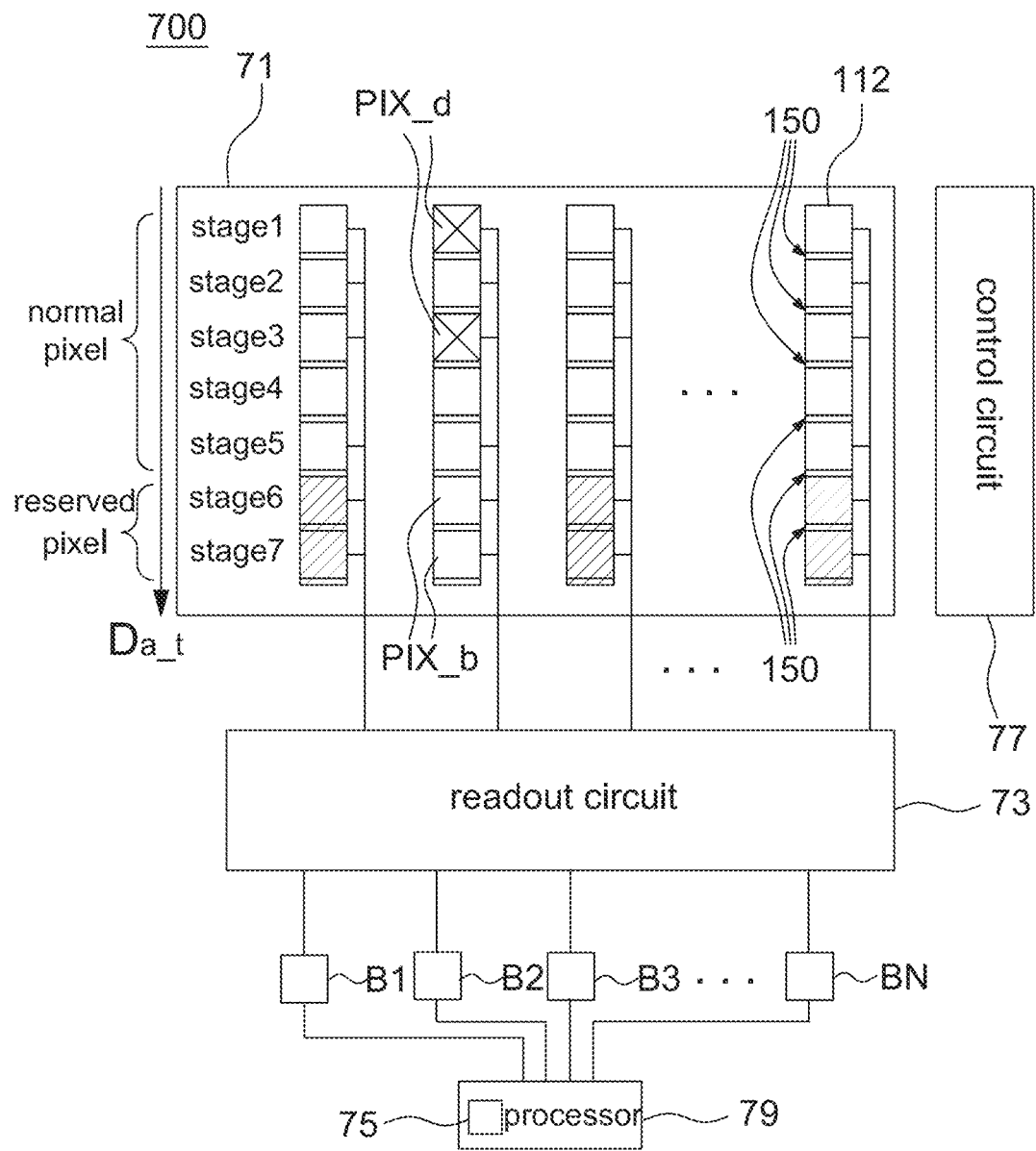

In FIGS. 7 to 9, pixel data of reserved pixels filled with slant lines in stage6 and stage1 is not integrated, and pixel data of blank reserved pixel (e.g., PIX_b herein) is integrated into the corresponding integrators B1 to BN.

In one aspect, the TDI CMOS image sensor 700 further includes a memory 75 for recording a pixel position of at least one defect pixel of the pixel array, e.g., PIX_d and PIX_d' in FIGS. 7 to 9. The pixel position of the at least one defect pixel is recorded before shipment of the TDI CMOS image sensor 700 or recorded in a test mode during operation without particular limitations.

One method to detect a defect pixel is to cause every pixel of the pixel array 71 to receive uniform light, and the pixel whose outputted pixel gray level exceeds a threshold range is considered a defect pixel. However, the defect pixel may be detected using other methods without particular limitations.

According to this embodiment, when the pixel array 700 has the defect pixel PIX_d as shown in FIG. 7, the readout circuit 73 reads pixel data of the reserved pixel PIX_b in the pixel column corresponding to the integrator B2 to be integrated into the integrator B2 so as to replace pixel data of the defect pixel PIX_d. For example, the readout circuit 73 still reads pixel data of the defect pixel PIX_d, but the read pixel data is not integrated into the integrator B2.

Furthermore, pixel data of other reserved pixels at the same row (e.g., stage6) as the reserved pixel PIX_b is not integrated into the corresponding integrators.

For example, when the pixel array 700 has the defect pixels PIX_d and PIX_d' as shown in FIG. 8, the readout circuit 73 reads pixel data of the reserved pixels PIX_b and PIX_b' in the pixel columns corresponding to the integrators B2 and B3 to be respectively integrated into the integrators B2 and B3 so as to replace pixel data of the defect pixels PIX_d and PIX_d'. Accordingly, even though one pixel column has a defect pixel, all integrators still integrate identical times of pixel data.

For example, when the pixel array 700 has two defect pixels PIX_d at the same column as shown in FIG. 9, the readout circuit 73 reads pixel data of two reserved pixels (e.g., stage6 and stage7) PIX_b in the pixel column corresponding to the integrator B2 to be integrated into the integrator B2 so as to replace pixel data of the two defect pixels PIX_d such that the integrator B2 integrate identical times of pixel data corresponding to a same position of the scene as other integrators.

It should be mentioned that although FIGS. 7 to 9 show that the reserved pixels stage6 and stage7 are arranged at the last pixel of the pixel column 112, the present disclosure is not limited thereto. In other aspects, the reserved pixel(s) are arranged at the top position or the central position of the pixel column 112 without particular limitations.

Figure 10:
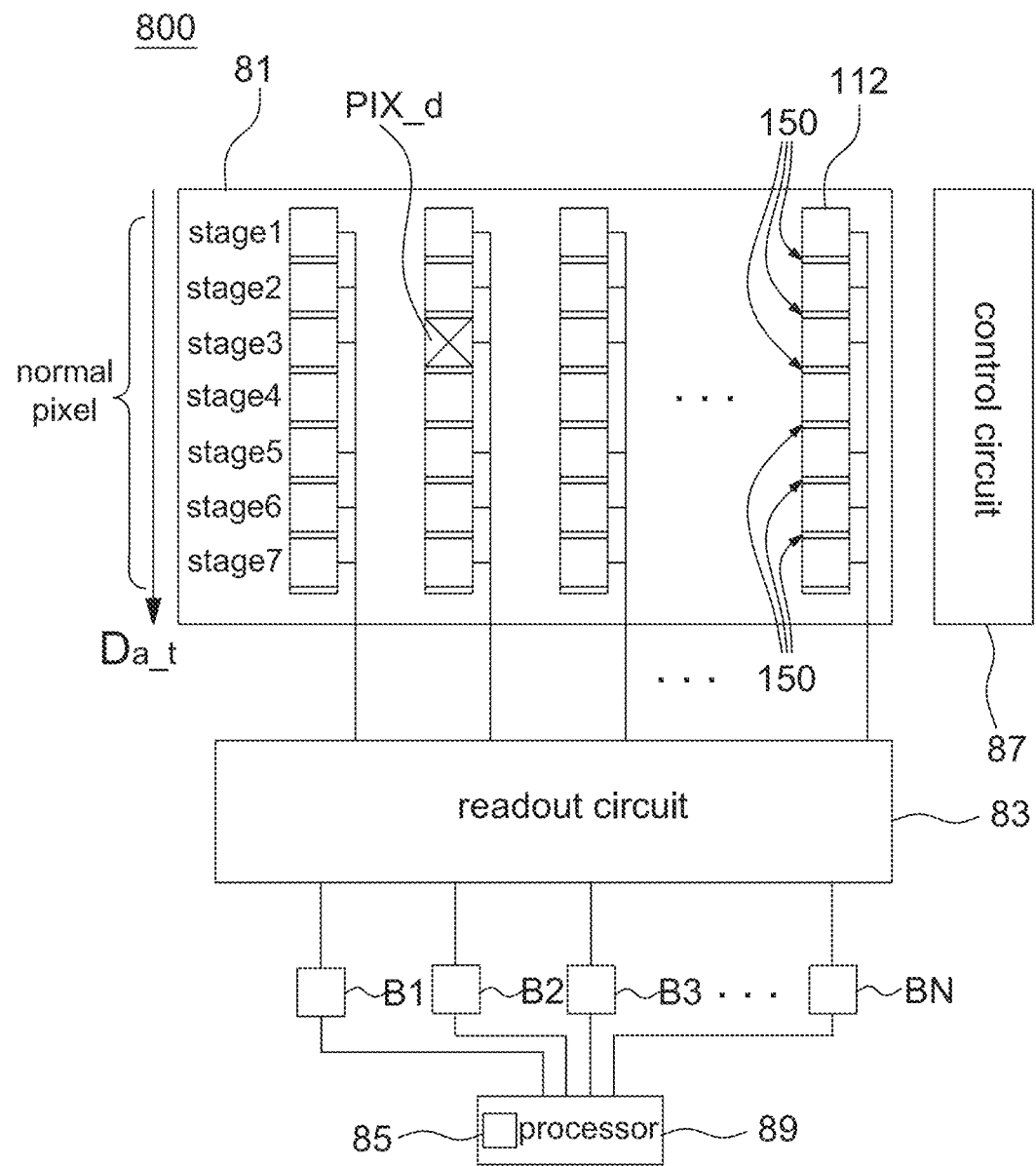
FIG. 10 is a schematic diagram of a TDI CMOS image sensor according to a fourth embodiment of the present disclosure.

Please refer to FIG. 10, it is a schematic diagram of a TDI CMOS image sensor 800 according to a fourth embodiment of the present disclosure. The TDI CMOS image sensor 800 also captures an image frame using a rolling shutter and moves with respect to a scene in an along-track direction $D_{a\_t}$.

The TDI CMOS image sensor 800 also includes a pixel array 81, a readout circuit 83, a control circuit 87, multiple integrators B1-BN and a processor 89.

Operations of the readout circuit 83 and the control circuit 87 are identical to the above embodiments, and thus are not repeated again.

The pixel array 81 also includes multiple pixel columns 112. Each of the pixel columns 112 includes multiple pixels (e.g., stage1 to stage7) arranged in the along-track direction $D_{a\_t}$, and two adjacent pixels of each of the pixel columns 112 have a separation space 150 therebetween.

The multiple integrators B1-BN are respectively coupled to the multiple pixel columns 112, and each of the multiple integrators B1 to BN integrate pixel data of the multiple pixels of a corresponding pixel column 112.

In one aspect, when the multiple pixels of one pixel column of the pixel array 81 has a defect pixel PIX_d, the integrator B2 corresponding to the pixel column at which the defect pixel PIX_d is located does not integrate pixel data of the defect pixel PIX_d. For example, the readout circuit 83 still reads pixel data of the defect pixel PIX_d, but the read pixel data is not integrated into the integrator B2, which is controlled, for example, by a transistor(s).

When the processor 89 receives pixel data integrated in the multiple integrators B1 to BN, a number of times of integrating pixel data by the integrator B2 is less than the number of times of integrating pixel data by other integrators that causes a lower SNR. However, in the case that the pixel column 112 includes a large number of pixels, i.e. integrating a large number of times, the post-processing result of the processor 89 is not significantly degraded.

In another aspect, when the multiple pixels of one pixel column of the pixel array 81 has a defect pixel PIX_d, a first integrator B2 corresponding to a first pixel column at which the defect pixel PIX_d is located integrates pixel data for a first number of integration times (e.g., 6 times), which is smaller than a second number of integration times (e.g., 7 times) of second integrators B1 and B3 to BN corresponding to second pixel columns without any defect pixel. As mentioned above, pixel data of the defect pixel PIX_d is not integrated into the first integrator B2. In post-processing pixel data, the processor 89 ratio-amplifies the pixel data integrated by the first integrator B2 according to a ratio= (second number of integration times/first number of integration times)=7/6 to achieve the same effect of integrating 7 times of pixel data.

Similarly, the TDI CMOS image sensor 800 further includes a memory 85 for recording a pixel position of at least one reserved pixel of the pixel array 81. The pixel position of the at least one defect pixel is recorded before shipment of the TDI CMOS image sensor 800 or recorded in a test mode during operation.

It should be mentioned that although the memory in FIGS. 7 to 10 are shown to be inside the processor 79, it is only intended to illustrate but not to limit the present disclosure. In other aspects, the memory is arranged outside the processor 79.

It should be mentioned that although FIG. 10 shows that the TDI CMOS image sensor 800 does not include any reserved pixel, the present disclosure is not limited thereto. The repairing method of pixel data (i.e. ignoring and ratio-amplifying pixel data) corresponding to FIG. 10 is also adaptable to the pixel array 71 of FIGS. 7-9. For example, if the pixel column corresponding to the integrator B2 in FIG. 9 has a further defect pixel, since said pixel column does not have enough reserved pixels to generate pixel data for replacing that of the defect pixel, the method provided corresponding to FIG. 10 is used to repair the pixel data.

Figure 1:
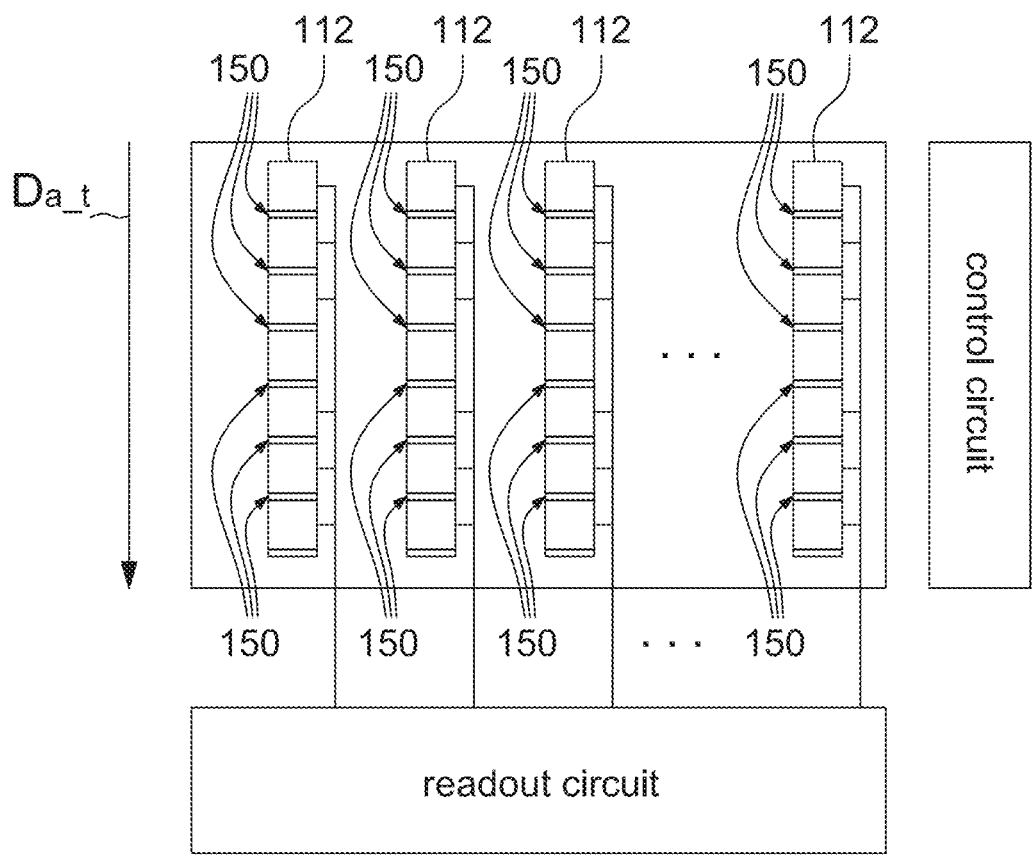
FIG. 1 is a schematic diagram of a CMOS image sensor for time delay integration (TDI) imaging.

It should be mentioned that although FIGS. 7 to 10 are illustrated using the pixel array in FIG. 1, i.e. the separation space being a multiplication of a pixel height in the along-track direction $D_{a\_t}$ by a time ratio of a line time difference of the rolling shutter and a frame period of capturing the image frame, the present disclosure is not limited thereto. Embodiments of FIGS. 7 to 10 are also adaptable to the pixel array 200 in FIG. 2, i.e. the separation space being a summation of a pixel height in the along-track direction $D_{a\_t}$ and a multiplication of the pixel height by a time ratio of a line time difference of the rolling shutter and a frame period of capturing the image frame as long as the TDI CMOS image sensors in FIGS. 7 to 10 include two groups of integrators to respectively integrate pixel data of multiple first pixels and multiple second pixels.

That is, according to the above descriptions, pixel data of defect pixels in the pixel array 200 in FIG. 2 is replaced by pixel data of defect pixels, directly ignored or repaired by a ratio.

It is appreciated that values, e.g., including a number of pixels, integrators and image frames, in every embodiment and drawing of the present disclosure are only intended to illustrate but not to limit the present disclosure.

As mentioned above, when the CMOS image sensor adopting rolling shutter technique is applied to TDI imaging, the integrated pixel data is not exactly corresponding to the same position or object in a scene to generate distortion because the exposure of all pixels of a pixel array is not started and ended at the same time. Accordingly, the present disclosure further provides a TDI CMOS image sensor using a rolling shutter (e.g., FIGS. 2 and 5) and an operating method thereof (e.g., FIGS. 3, 4A and 6) that compensate the line time difference of a rolling shutter, which causes distortion, by arranging different pixel separation spaces. By arranging the control signal of a control circuit correspondingly, pixel data of corresponding position is integrated to the associated integrator correctly.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A time delay integration (TDI) image sensor, configured to capture an image frame using a rolling shutter and move with respect to a scene in an along-track direction, the image sensor comprising:
    a pixel array, comprising multiple pixel columns, each of the pixel columns comprising multiple pixels arranged in the along-track direction, and two adjacent pixels of each of the pixel columns having a separation space therebetween, wherein the multiple pixels of each of the pixel columns comprise multiple normal pixels and at least one reserved pixel, and the separation space comprises a multiplication of a pixel height in the along-track direction by a time ratio of a line time difference of the rolling shutter and a frame period of capturing the image frame; and
    multiple integrators, respectively coupled to the multiple pixel columns, and each of the multiple integrators being configured to integrate pixel data of the multiple normal pixels at a corresponding pixel column,
    wherein when the multiple normal pixels have a defect pixel, the integrator corresponding to a pixel column of the defect pixel integrates pixel data of the reserved pixel to replace pixel data of the defect pixel.

2. The image sensor as claimed in claim 1, wherein the line time difference is a time interval between a time of starting exposure of two adjacent pixel rows of the pixel array.

3. The image sensor as claimed in claim 1, further comprising a memory configured to record a pixel position of at least one defect pixel of the pixel array.

4. The image sensor as claimed in claim 3, wherein the pixel position of the at least one defect pixel is recorded before shipment or recorded in a test mode during operation.

5. The image sensor as claimed in claim 1, wherein the multiple integrators are respectively configured to integrate pixel data of a same position of the scene in adjacent image frames.

6. The image sensor as claimed in claim 1, further comprising a readout circuit and a reserved pixel row, wherein
    upon the multiple normal pixels having no defect pixel, the readout circuit is configured not to read pixel data of the reserved pixel row, and
    the readout circuit is configured to read the pixel data of the reserved pixel row only when the multiple normal pixels have at least one defect pixel.

7. The image sensor as claimed in claim 1, further comprising a readout circuit and a reserved pixel row, wherein
    upon the multiple normal pixels having no defect pixel, the readout circuit is configured to read pixel data of the reserved pixel row, but the pixel data of the reserved pixel row read by the readout circuit is not integrated into the multiple integrators.

8. A time delay integration (TDI) image sensor, configured to capture an image frame using a rolling shutter and move with respect to a scene in an along-track direction, the image sensor comprising:

a pixel array, comprising multiple pixel columns, each of the pixel columns comprising multiple pixels arranged in the along-track direction, and two adjacent pixels of each of the pixel columns having a separation space therebetween, wherein the separation space comprises a multiplication of a pixel height in the along-track direction by a time ratio of a line time difference of the rolling shutter and a frame period of capturing the image frame; and multiple integrators, respectively coupled to the multiple pixel columns, and each of the multiple integrators being configured to integrate pixel data of the multiple pixels at a corresponding pixel column, wherein when the multiple pixels have a defect pixel, the integrator corresponding to a pixel column of the defect pixel does not integrate pixel data of the defect pixel.

9. The image sensor as claimed in claim 8, wherein the multiple integrators are respectively configured to integrate pixel data of a same position of the scene in adjacent image frames.

10. The image sensor as claimed in claim 8, further comprising a memory configured to record a pixel position of at least one defect pixel of the pixel array.

11. The image sensor as claimed in claim 10, wherein the pixel position of the at least one defect pixel is recorded before shipment or recorded in a test mode during operation.

12. A time delay integration (TDI) image sensor, configured to capture an image frame using a rolling shutter and move with respect to a scene in an along-track direction, the image sensor comprising:

a pixel array, comprising multiple pixel columns, each of the pixel columns comprising multiple pixels arranged in the along-track direction, and two adjacent pixels of each of the pixel columns having a separation space therebetween, wherein the separation space comprises a multiplication of a pixel height in the along-track direction by a time ratio of a line time difference of the rolling shutter and a frame period of capturing the image frame; and multiple integrators, respectively coupled to the multiple pixel columns, and each of the multiple integrators being configured to integrate pixel data of the multiple pixels at a corresponding pixel column, wherein when the multiple pixels have a defect pixel, a first integration number of pixel data of a first integrator corresponding to a first pixel column at which the defect pixel is located is smaller than a second integration number of pixel data of a second integrator corresponding to a second pixel column at which the defect pixel is not located.

13. The image sensor as claimed in claim 12, further comprising a memory configured to record a pixel position of at least one defect pixel of the pixel array.

14. The image sensor as claimed in claim 13, wherein the pixel position of the at least one defect pixel is recorded before shipment or recorded in a test mode during operation.

15. The image sensor as claimed in claim 12, wherein the multiple integrators are respectively configured to integrate pixel data of a same position of the scene in adjacent image frames.

16. The image sensor as claimed in claim 12, further comprising a processor configured to ratio-amplify the pixel data integrated by the first integrator according to a ratio equal to the second integration number divided by the first integration number.

* * * * *